United States Patent [19]

Bilanceri et al.

[11] 4,288,733

[45] Sep. 8, 1981

[54] BATTERY CHARGER SYSTEM AND METHOD ADAPTED FOR USE IN A STERILIZED ENVIRONMENT

[75] Inventors: Silvio G. Bilanceri, Owings Mills; Gary L. Kanner, Parkton; Michael B. Uffer, Baltimore, all of Md.

[73] Assignee: Black & Decker Inc., Newark, Del.

[21] Appl. No.: 86,027

[22] Filed: Oct. 17, 1979

[51] Int. Cl.³ .......................................... H01M 10/44
[52] U.S. Cl. ........................................ 320/2; 320/48; 128/419 B; 128/419 PS; 429/163
[58] Field of Search ................. 320/2, 48; 128/419 N, 128/419 B, 419 PS, 801; 429/91, 163

[56] References Cited

U.S. PATENT DOCUMENTS

| 3,370,214 | 2/1968 | Aymar | 320/48 |
| 3,644,873 | 2/1972 | Dalton et al. | 320/2 X |
| 3,867,950 | 2/1975 | Fischell | 320/2 X |
| 4,211,968 | 7/1980 | Sugalski | 320/2 |

FOREIGN PATENT DOCUMENTS

| 2608458 | 3/1976 | Fed. Rep. of Germany | 320/2 |
| 2702129 | 1/1977 | Fed. Rep. of Germany | . |

OTHER PUBLICATIONS

"Implanted Power Sources" by J. Cassel et al.—Medical Instrumentation, vol. 7, No. 3, May-Aug. 1973, pp. 176-179.

Primary Examiner—J. V. Truhe
Assistant Examiner—Richard M. Moose
Attorney, Agent, or Firm—Harold Weinstein; Leonard Bloom; Edward D. Murphy

[57] ABSTRACT

A battery charger system suited for use in a sterilized environment such as an operating room includes a sterilizable battery-containing pack adapted for connection to a non-sterilized battery charger through a sterilizable tray-interface. The tray-interface includes connecting structure on an upper side for mechanical and electrical connection to at least one battery pack and additional connecting structure on a lower side for mechanical and electrical connection to the charger. The upper side and lower side electrical connections are inter-connected to effect electrical coupling between the sterilized battery and the non-sterilized charger so that the battery may be charged, discharged, or tested. A sterilizable drape is adapted to be constrained between the tray-interface and the charger to isolate the charger from the sterilized environment. Encodable switch-operating tabs are provided on the tray-interface to automatically effect the desired operating mode of the charger when the tray-interface is connected to the charger, and indicating apertures are provided through which the operating mode of the charger can be determined.

18 Claims, 6 Drawing Figures

BATTERY CHARGER SYSTEM AND METHOD ADAPTED FOR USE IN A STERILIZED ENVIRONMENT

FIELD OF THE INVENTION

The present invention relates to a battery charger system and method and, more particularly, to a battery charger system and method using a sterilizable interface for charging, discharging, and testing rechargeable batteries in a sterilized environment such as a hospital operating room.

BACKGROUND OF THE INVENTION

Medical instruments used in hospital operating room environments must be maintained in a sterile condition prior to and during surgery. Sterilization of these instruments is most commonly achieved by thermal treatment in an autoclave in which the instruments are subjected to a steam flow in an enclosed chamber at an elevated temperature and pressure for a predetermined period of time. Other sterilization procedures include bactericidal chemical washes and exposure to various types of light radiation, nuclear radiation, and charged-particle radiation. Traditional medical instruments are, of course, fabricated from materials that permit repeated sterilization over a long period of time without deterioriation. As medical instrument technology has advanced, more instruments are being developed which utilize electrical and electronic components. An example of one such device is a hand-held electrical drill that receives its operating power from detachable rechargeable battery packs. While power tools of this type provide obvious advantages to a surgeon during an operation, a practical problem results from the need to sterilize the tool and/or to use sterilizable portable tools.

It is generally considered impracticable to provide a sterilized rechargeable battery or battery pack in an operating room context since the batteries are oftentimes fatally degraded during thermal sterilization, and other sterilization techniques, such as radiation sterilization, are not practical in an operating room environment. In addition, it is also considered impracticable to prepare or otherwise provide charged sterilized batteries and store them in their sterilized state for subsequent use in the operating room since the shelf life of the batteries is both variable and of comparatively short duration.

SUMMARY OF THE INVENTION

In view of this, it is a broad overall object of the present invention, among others, to provide a battery charger system for use in a sterilized environment such as a hospital operating room in which a sterilized rechargeable battery can be effectively charged, discharged, and/or tested while maintaining its sterilized state.

It is another object of the present invention to provide a battery charger system for use in a sterile environment in which the sterilized battery can be charged, discharged, and/or tested using a non-sterilized battery charger while maintaining and protecting the sterilized state of the battery.

It is another object of the present invention to provide a battery charger system for use in sterilized environments in which a sterilized rechargeable battery can be charged, discharged, and/or tested in cooperation with a nonsterilized battery charger through a sterilized interface which maintains the sterilized state of the battery.

It is still another object of the present invention to provide a battery charger interface for use in combination with a sterile rechargeable battery and non-sterile battery charger whereby the sterile battery can be interconnected with the non-sterile charger to effect electrical cooperation thereof while advantageously maintaining the sterile state of the rechargeable battery.

It is still another object of the present invention to provide a sterilizable battery charger interface for mechanically and electrically interconnecting a sterile rechargeable battery with a non-sterile battery charger in which the various operating modes of the battery charger can be controlled through the interface without affecting the sterile state of the rechargeable battery.

It is a further object of the present invention to provide a sterilizable interface for a battery charger system in which a sterilized battery can be mechanically and electrically interconnected with a non-sterile battery charger in which the various operating modes of the battery charger can be determined without affecting the sterilized state of the battery.

It is still a further object of the present invention to provide a method for charging, discharging, and/or testing a sterile battery with a non-sterile battery charger without adversely affecting the sterile state of the battery.

A battery charger system and method for use in a sterilized environment such as a hospital operating room in accordance with the present invention includes a sterilizable battery-containing pack and a non-sterilizable battery charger unit that are interconnected through a sterilized interface so that the sterilized condition of the battery is maintained during charging, discharging, and testing of the battery by the battery charger. The interface includes connecting structure on an upper surface for mechanical connection to at least one rechargeable battery and additional connecting structure on the lower surface for mechanical connection to the battery charger. Interconnected electrical contacts on the upper and lower surfaces of the interface electrically couple the battery and the charger. Provision is made for securing a sterilized drape between the interface and the charger to assist in maintaining the sterility of the environment. User encodable means are provided on the lower side of the interface to contact selected ones of charger mode determining switches such that the charger may operate in selected ones of a plurality of modes including a charging, a discharging, and/or battery test mode. In the preferred embodiment, the encodable switch means include a plurality of depending, break-away tabs located on the lower surface of the interface in registration with tab-operated switches on the charger. Selected ones of the tabs may be broken-away so that the interface, when connected to the charger, will cause the charger to operate in a selected mode. In addition, the interface is provided with apertures through which light emitting indicators on the charger direct light to permit the operating state of the charger to be readily determined.

The interface advantageously permits the user to recharge, discharge, and/or test a sterilized battery by connection through the sterilizable interface with a non-sterilizable battery charger while maintaining the sterilized state of the battery.

DESCRIPTION OF THE FIGURES

The above description, as well as the objects, features, and advantages of the present invention will be more fully appreciated by reference to the following detailed description of a presently preferred but nonetheless illustrative embodiment in accordance with the present invention when taken in conjunction with the accompanying drawings wherein.

DESCRIPTION OF THE PREFERRED EMBODIMENT

Figure 1:
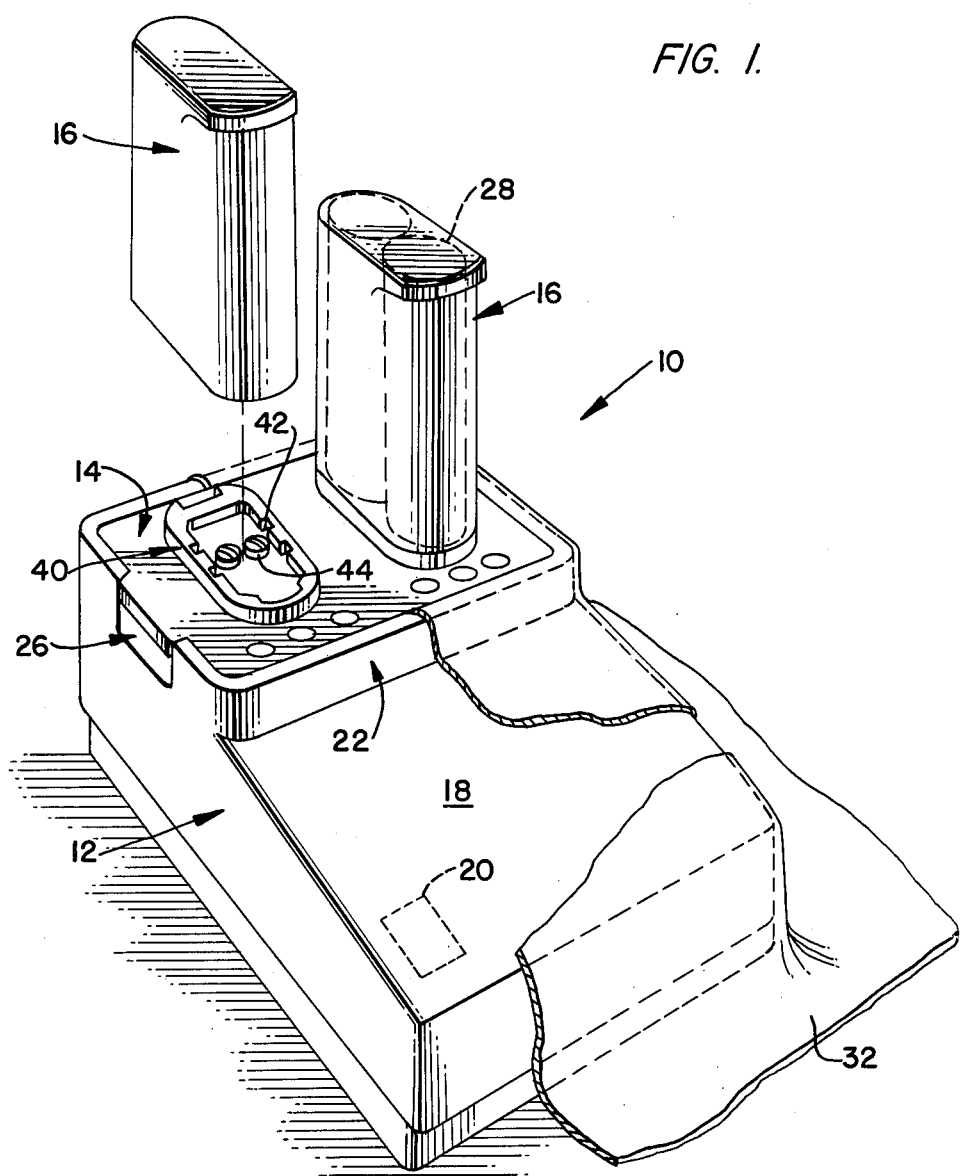
FIG. 1 is a perspective view of the battery charger system in accordance with the present invention showing a drape-covered charger, a tray-like interface inserted within a cavity in the charger, and two rechargeable batteries, one of which is connected to the interface and the other of which is positioned above the interface for reasons of clarity.

A battery charging system in accordance with the present invention is shown in perspective in FIG. 1 and is generally referred to therein by the reference character 10. The battery charger system includes a battery charger 12, a removable interface 14, and one or more rechargeable battery packs 16.

The battery charger 12 includes a forwardly sloping panel 18 having a conventional, manually operated ON/OFF switch 20 (broken-line illustration) for controlling main power to the battery charger 12. A wall 22 extends upwardly from the rear portion of the battery charger 12 and defines a generally rectangular cavity 24 (shown in cross section in FIG. 4) for receiving the interface 14 with the opposite lateral sides of the wall 22 provided with keyways or slots 26 (only one of which is shown in FIG. 1). The battery charger 12, as described in more detail below, is adapted to operate in one of a plurality of modes including a charge mode during which time the battery pack(s) 16 are charged with electrical energy, a discharge mode during which time the electrical energy stored in the battery pack(s) is removed, and a test mode during which the charge state of the battery pack is determined. Battery charger circuits suitable for use with the present invention include the circuits disclosed in U.S. patent applications Ser. Nos. 911,268 and 911,554 both filed on May 31, 1978 and assigned to the assignee of the present invention. The disclosure of these two applications is incorporated herein to the extent necessary to practice the present invention.

The battery packs 16 are preferably formed from a hermetically sealed, molded plastic shell and contain conventional fast rechargeable nickel-cadmium cells 28 as shown in broken-line illustration in FIG. 1.

Figure 2:
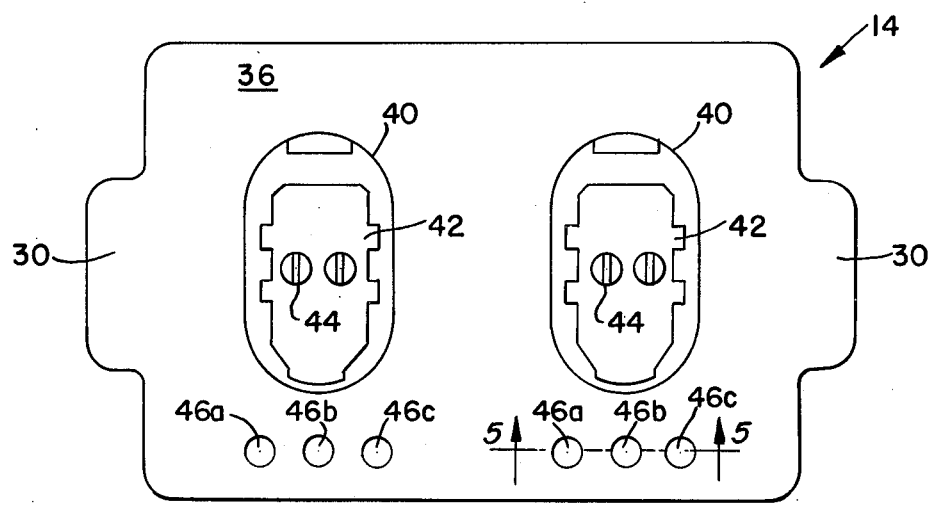
FIG. 2 is a plan view of the upper surface of a interface in accordance with the present invention showing mechanical and electrical connecting structure for effecting connection with the two rechargeable batteries shown in FIG. 1.
Figure 3:
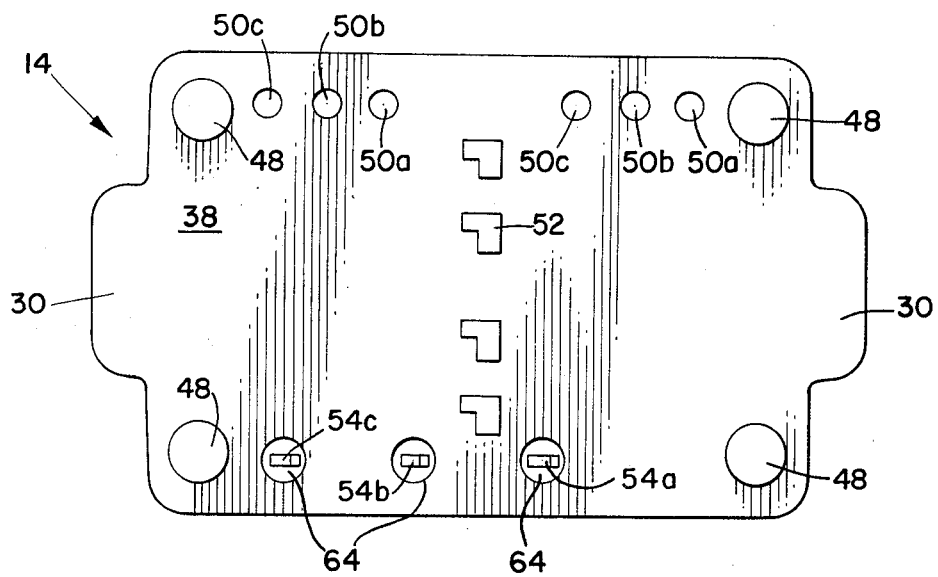
FIG. 3 is a bottom view of the interface shown in FIG. 2 showing mechanical and electrical connecting structure for effecting connection to the battery charger.
Figure 4:
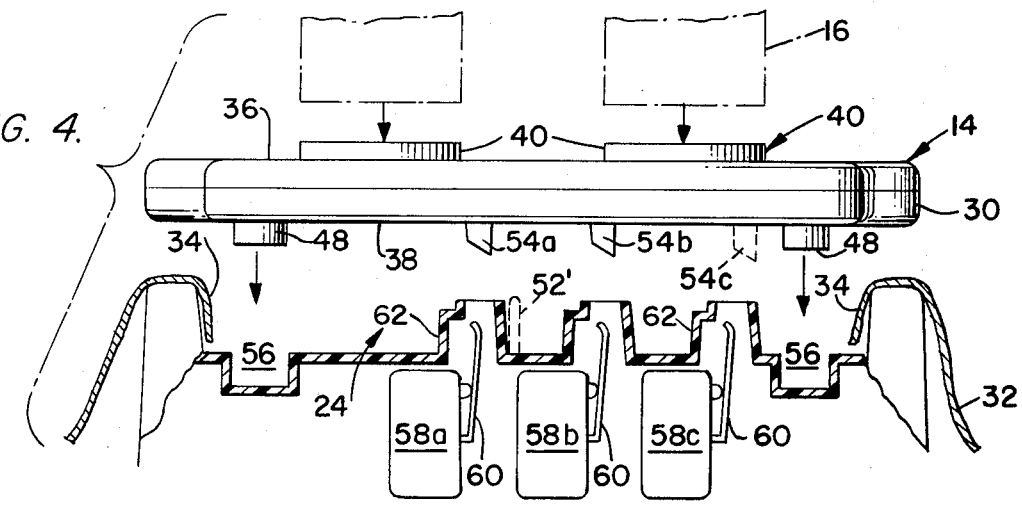
FIG. 4 is a partial, exploded elevational view of the tray-receiving cavity of the battery charger showing charger mode control switches, the interface of FIGS. 2 and 3 raised above the interface-receiving cavity of the charger, and encodable switch operating tabs.

The interface 14 includes connecting means by which a sterilized battery pack 16 can be mechanically and electrically connected to the battery charger 12 without affecting the sterile state of the battery. The interface 14, as shown in FIGS. 2 and 3, is formed as a generally flat, rectangular body having laterally extending tabs 30 that are designed to fit within the slots 26 formed in the wall 22 that defines the interface-receiving cavity 24 of the battery charger. The interface 14 and the cavity 24 cooperate with one another so that a sterilizable drape 32 can be secured in place over the battery charger 12 to assist in maintaining the sterility of the operating room environment. The drape 32 is provided with a central aperture having approximately the same shape, though somewhat smaller in area, than the cavity 24 such that the marginal portions 34 of the drape opening, as shown in FIG. 4, fit within the cavity, and, when the interface 14 is inserted into the cavity 24, the aforementioned marginal portions 34 of the drape opening are effectively secured and retained between the inwardly facing surfaces of the wall 22 that define the cavity 24 and the outwardly facing peripheral edges of the interface 14. The interface 14 includes an upper surface 36 and a lower surface 38, both surfaces of which include connecting structure to effect mechanical and electrical connection between the rechargeable battery pack 16 and the battery charger 12. In the preferred embodiment, two battery connecting plates 40 are provided on the upper surface 36 of the interface 14 with each plate constituting a battery connecting station. Each battery connecting plate 40 includes lug receiving keyways 42 that are designed to mechanically engage complementary lugs (not shown) on the battery pack 16. A suitable lug connection interface for the battery 16 and the interface 14 is disclosed in co-pending U.S. patent application Ser. No. 086,026 filed on even date herewith by Robert Hickman Riley, Jr. and entitled "Mechanical and Electrical Connection Interface for A Battery Containing Pack" and assigned to the assignee of the present invention. Two spaced apart electrically conductive contacts 44, such as silver-plated, button-head screws, are provided within the battery connecting plate 40 to make contact with electrical contacts (not shown) on the battery pack 16.

A set of indicating apertures 46a, 46b, and 46c are provided forwardly of each battery charging station on the upper surface 36 of the interface. The indicating apertures 46a, 46b, and 46c, as described in more detail below, are each in registration with a light emitting indicator on the battery charger to permit the battery charger 12 user, usually hospital operating personnel, to determine the operating state of the charger.

The lower surface 38 of the interface 14 includes, as shown in FIG. 3, a support foot 48 located adjacent each corner of the interface 14, the lower openings 50a, 50b, and 50c of the indicating apertures 46a, 46b, and 46c, electrical connector openings 52 for receiving and effecting electrical connection with mating electrical contacts 50' (broken-line illustration in FIG. 4) on the battery charger 12, and encodable switch actuating tabs 54a, 54b, and 54c.

The interface 14 is adapted to be received within the interface-receiving cavity 24 of the battery charger 12 with the support feet 48 each being received within a foot-receiving well 56 formed in the bottom surface of the cavity 24. Various types of mechanical latches (not shown) may be used to retain the interface 14 in place in the cavity 24. When the interface 14 is fitted within the cavity 24, a clearance dimension exists between the inwardly facing walls of the cavity 24 and the outwardly facing peripheral edges of the interface 14 is such that the sterilized drape 32, as described above, will be retained in place.

Figure 4A:
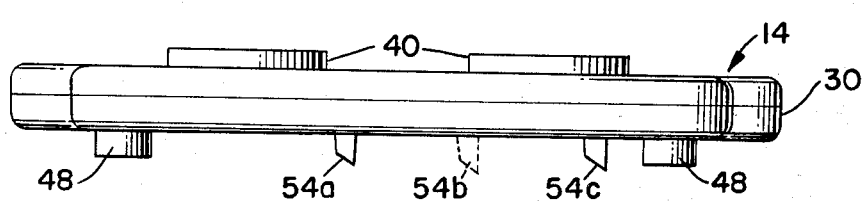
FIG. 4A is a front elevation view of an interface showing another configuration of the encodable tabs.

The encodable tabs 54a, 54b, and 54c are used to control the operation of the charger 12 when the interface 14 is inserted into the cavity 24. As shown in FIG. 4, the battery charger 12 includes a plurality of micro switches 58a, 58b, and 58c that each include an actuator arm 60 that extends upwardly into a hollow tab-receiving column 62. The switches 58a, 58b, and 58c, when actuated, command the battery charger 12 to operate in one of a plurality of operating modes including a discharge mode, a charge mode, and a test mode. The tabs 54a, 54b, and 54c depend from the lower surface 36 of the interface 14 through openings 64 and are in registration with the tab-receiving columns 62 such that a tab 54a, 54b, and 54c, when the interface 14 is inserted within the interface-receiving cavity 24, will actuate its associated switch 58a, 58b, and 58c. The individual tabs 54a, 54b, and 54c are designed to be selectively brokenaway such that an interface 14 can be dedicated to a particular function, that is, an interface 14, by removal of the appropriate switching tabs, can be dedicated to a charge function only, while another interface 14, by removal of the appropriate switch tabs, can be dedicated to a discharge or test function. By providing the interface 14 with encodable switch tabs, the battery charger 12 may be commanded to operate in any one of its available operating modes by mere insertion of the appropriate encoded interface 14. For example, as shown in FIG. 4, when the right-hand tab 54c (broken-line illustration) is removed so that only the tabs 54a and 54b remain to actuate the corresponding switches 58a and 58b, the battery charger 12 is caused to operate in e.g., a charge mode, and as shown in FIG. 4A, when the central tab 54b (broken-line illustration) is removed so that only the tabs 54a and 54c remain to actuate the switches 58a and 58c, the battery charger 12 is caused to operate in a discharge mode.

The encoding tabs 54a, 54b, and 54c thus eliminate the need for the operating room personnel to manually operate specific switches on the charger 12 and thereby assist in preserving the sterile operating room environment. In the preferred embodiment, the various encoded interfaces 14 are also color-coded and provided with appropriate legends to identify the particular function for which the interface has been dedicated.

Figure 5:
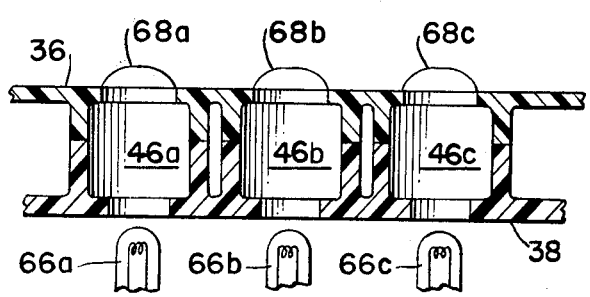
FIG. 5 is a partial cross-sectional view of the interface taken along line 5—5 of FIG. 2 showing indicating apertures and lenses in registration with light emitting indicators on the battery charger.

The indicating apertures 46a, b, and c for each battery station described above, are shown in detail in FIG. 5. The apertures 46a, b, and c are formed through the body of the interface 14 with the lower openings 50a, b, and c of the apertures 46a, b, and c in registration with light emitting indicators 66a, 66b, and 66c (e.g. a filament-type lamp or light emitting diode) provided in the cavity 24. The upper surface opening of each aperture 46a, b, and c is provided with a color-coded lens 68a, 68b, and 68c so that the light radiated from the non-sterilizable light emitting indicators on the battery charger 12 is directed through the sterilizable aperture of the interface 14 to the lenses 68a, 68b, and 68c so that the battery charger user can readily determine the operating state of the charger 12.

In using the battery charger system of the present invention in an operating room environment, the battery charger 12 is sterilized to the extent possible by chemical washes and then covered with a sterilized drape. Thereafter, a sterile battery 16 is installed on an interface 14 specially dedicated to the discharge function (by appropriate removal of the breakaway tabs 54a, 54b, and 54c). The discharge-dedicated interface 14 and the battery 16 are then inserted into the cavity 24 causing the charger 12 to operate in a discharge mode. When the battery is discharged, as indicated by the light directed through the appropriate aperture 46a, 46b, or 46c to indicate and assure that the battery is in fact discharged, the battery may be removed from the discharge-dedicated interface and sterilized in an autoclave. Thereafter, the sterilized, discharge battery 16 is connected to another sterilized interface 14 dedicated to the charge function with this latter interface and the battery installed in the cavity 24 causing the charger 12 to operate in a charge mode. After charging, as indicated by the light directed through the appropriate indicating aperture 46a, b, or c, the sterile, charged battery 16 may then be used to power sterilize medical instruments or the like.

As can be appreciated, the sterilizable interface advantageously permits a sterilized battery to be charged, discharged, and tested using a non-sterilizable battery charger without adversely affecting the sterile state of the battery.

As will be apparent to those skilled in the art, various changes and modifications may be made to the battery charger system and method of the present invention without departing from the spirit and scope of the invention as recited in the appended claims and their legal equivalent.

What is claimed is:

1. A battery charger system for use in a sterile environment such as an operating room, comprising:
    a battery charger for electrical connection to at least one rechargeable battery;
    an interface for operative connection between at least one rechargeable battery and said charger, said interface including a first connection means on one surface portion thereof for coupling with at least one rechargeable battery and a second connection means on another surface portion thereof for coupling with said charger and electrical interconnection means for effecting electrical connection between said battery and battery charger; and
    means for securing a sterilized drape between said interface and said charger.

2. The battery charger system claimed in claim 1 wherein said securing means further comprises:
    a cavity formed in said charger for accepting said interface, the marginal portions of an aperture of a sterilized drape positionable adjacent wall portions of said cavity, said interface, when inserted into said cavity, constraining the marginal portions of said drape between said interface and said wall portions of said cavity.

3. A battery charger system for use in a sterile environment such as an operating room, comprising:
    a battery charger for electrical connection to at least one rechargeable battery;

an interface for operative connection between at least one rechargeable battery and said charger, said interface including a first connection means on one surface portion thereof for coupling with at least one rechargeable battery and a second connection means on another surface portion thereof for coupling with said charger and electrical interconnection means for effecting electrical connection between said battery and battery charger; and switch actuating means on said interface for actuating switches on said charger.

4. The battery charger system claimed in claim 3 wherein said switch actuating means comprises:

a plurality of tab positions in registration with switch means on said charger, selected ones of said tab positions including depending tabs for actuating selected ones of said switches when said interface is connected to said charger.

5. An improved battery charger system for an operating room environment, said system of the type having a nonsterilizable battery charger adapted for connection to at least one sterilizable battery to effect charging thereof, said improvement comprising:

a sterilizable interface interposed between said battery charger and the battery having means on one side thereof for connection with the battery and means on the other side thereof for connection with said charger, said interface including electrical connection means to effect electrical connection between said charger and the battery; and means for securing a sterilized drape between said interface and said charger.

6. The improved battery charger system claimed in claim 5 wherein said securing means further comprises:

a cavity formed in said charger for accepting said interface, the marginal portion of an aperture formed in a sterilized drape positionable adjacent the wall portions of said cavity, said interface, when inserted into said cavity, constraining the marginal portions of said drape between said interface and said wall portions of said cavity.

7. An improved battery charger system for an operating room environment, said system of the type having a nonsterilizable battery charger adapted for connection to at least one sterilizable battery to effect charging thereof, said improvement comprising:

a sterilizable interface interposed between said battery charger and the battery having means on one side thereof for connection with the battery and means on the other side thereof for connection with said charger, said interface including electrical connection means to effect electrical connection between said charger and the battery; and switch actuating means on said interface for actuating switches on said charger.

8. The battery charger system claimed in claim 7 wherein said switch actuating means comprises:

a plurality of tab positions in registration with switch means on said charger, seclected ones of said tab positions including depending tabs for actuating selected ones of said switches when said interface is connected to said charger.

9. A method of charging a sterilized rechargeable battery in a sterile environment by connection to a nonsterile battery charger, comprising the steps of:

mechanically and electrically connecting a sterile interface with a battery charger, said interface effective to electrically interconnect a sterilized battery and said charger;

mechanically and electrically connecting said sterilized battery to said interface;

charging said battery by operation of said charger; and disconnecting said sterile battery from said interface.

10. A method of obtaining a charged sterile rechargeable battery, comprising the steps of:

discharging a rechargeable battery;

sterilizing said discharged battery;

mechanically and electrically connecting said sterilized, discharged battery to a sterilized interface;

mechanically and electrically connecting said sterilized interface to a battery charger, said interface effective to electrically interconnect said battery and said charger;

charging said battery by operation of said charger; and disconnecting said sterile, charged battery from said interface.

11. A battery charger system for use in a sterile environment such as an operating room, comprising:

a battery charger;

a sterilizable rechargeable battery;

a sterilized interface having means for mechanically and electrically connecting said battery to said charger; and a sterilized drape in operative association with said interface and said charger.

12. The battery charger system claimed in claim 11, wherein:

said drape has an aperture through which said battery is interconnected to said charger.

13. The battery charger system claimed in claim 12, wherein:

said interface includes a body having an upper surface and a lower surface;

said connecting means includes mechanical connecting means on said upper surface for connecting with said battery and mechanical connecting means on said lower surface for connecting with said charger;

said connecting means further includes electrical contact means on said upper and lower surfaces for electrically connecting with complementary contacts on said battery and said charger, respectively; and said drape aperture is in registration with said upper surface mechanical connecting means and electrical contact means.

14. The battery charger system claimed in claim 11, further comprising:

a switch connected to said charger; and means connected to said interface for interacting with said switch.

15. The battery charger system claimed in claim 11, further comprising:

light-emitting indicating means connected to said charger for indicating the operating state of said charger; and wherein:

said interface has an aperture in registration with said light-emitting indicating means.

16. A battery charger system for use in a sterile environment such as an operating room, comprising:

a battery charger;

a sterilizable rechargeable battery;

a sterilized interface having means for mechanically and electrically connecting said battery to said charger; and means for securing a sterilized drape in operative association with said interface.

17. The battery charging system claimed in claim 16, further comprising:

a switch connected to said charger; and means connected to said interface for interacting with said switch.

18. The battery charging system claimed in claim 16, further comprising:

means connected to said interface for indicating the operating state of said charger.

* * * * *